United States Patent [19]

Vigerie

[11] 4,067,595

[45] Jan. 10, 1978

[54] STABILIZER BEAM FOR STABILIZING A MACHINE FOR USE ON ROUGH GROUND

[75] Inventor: Robert Vigerie, Saint-Chamond, France

[73] Assignee: Creusot-Loire, Paris Cedex, France

[21] Appl. No.: 750,899

[22] Filed: Dec. 15, 1976

[51] Int. Cl.[2] .............................................. B60S 9/02

[52] U.S. Cl. .............................................. 280/766

[58] Field of Search .............................. 280/766, 765

[56] References Cited

U.S. PATENT DOCUMENTS

| | | | |
|---|---|---|---|
| 3,007,717 | 11/1961 | Noly | 280/765 |
| 3,843,154 | 10/1974 | Thompson | 280/766 |
| 3,871,685 | 3/1975 | Senelet | 280/766 |
| 3,901,532 | 8/1975 | Hornagold | 280/766 |

*Primary Examiner*—Robert R. Song

*Attorney, Agent, or Firm*—Haseltine, Lake & Waters

[57] ABSTRACT

A stabilizer beam for stabilizing a machine for use on rough ground for extending the frame of the machine laterally, the stabilizer beam comprising a supporting box girder to be integral with or rigidly attached to the frame of the machine, a supporting beam slidable in the box girder, a bearer jack carrying a bearer shoe and pivotally connected to that one end of the beam to be remote from the machine frame such that the jack is movable from a rest position in which the jack is substantially horizontal and the bearer shoe is in contact with the end face of the beam, and an operative position in which the jack is substantially vertical, means for supporting and guiding the jack in its movement relative to the beam and pivotally mounted on the one end of the beam, means for locking the jack in its vertical position and operable on relative movement between the beam and box girder, and means for pushing and pulling in the direction of the axis of the beam and pivotally connected to the jack, the pushing and pulling means being operable to cause movement of the jack between its operative and inoperative position and extension and retraction of the beam relative to the box girder.

5 Claims, 13 Drawing Figures

STABILIZER BEAM FOR STABILIZING A MACHINE FOR USE ON ROUGH GROUND

FIELD OF INVENTION

The invention refers to a machine-stabilizer beam for stablizing a machine in use on rough unmade-up ground.

BACKGROUND

Movable handling-machines, for example, mobile cranes, are very often equipped with stabilizer beams of variable elongation which extend the frame of the machine laterally and each carry at the end remote from the machine a bearer jack. When the machine has reached its work-station the stabilizer beams are run out to a length compatible with the space available and the vertical bearer jacks connected to the ends of the stabilizer beams are actuated, the downwards movement of the rods of these jacks causing bearer shoes which are fixed to the bottom ends of the jack rods to be placed in contact with the ground. The bearer jacks then lift the machine which no longer rests on the ground other than by means of the bearer jacks.

The stabilizer beams of handling machines generally consist of horizontal beams supporting the bearer jacks, which are mounted to slide inside supporting box-girders integral with the frame of the handling machine.

For such mobile handling-machines employed on unmade-up ground the stabilizer beams equipped with their bearer jacks have disadvantages connected with the fact that the bearer jacks in their closed or inoperative positions (rods returned) at the ends of the stabilizer beams considerably reduce the ground clearance of the machine as may be seen in FIG. 5 representing a bearer jack in the closed position (rod returned) at the end of a supporting box girder of a stabilizer beam of a handling machine. In particular if bearer jacks are needed which have a long stroke in order to achieve levelling of the machine on unmade-up ground, or for use where the differences in level or undulations of the ground may be considerable, the bulk of the jacks in their closed positions becomes such that the ground clearances are insufficient for the handling machine to move about.

The disadvantages are such that they destroy to a great extent the advantages connected with the employment of stabilizer beams of variable elongation, the horizontal arrangement of which enables both a maximum and variable spread of the bearing jacks and a ground clearance compatible with moving about over unmade-up ground, beams furthermore giving the frame excellent rigidity with respect to the ground and the device thus produced being of a low cost price connected with the simplicity of construction.

Additionally, the employment of these machines on any kind of ground necessitates the employment of bearer shoes of large dimensions fixed to the ends of the bearer jack rods. These bearer shoes are so bulky that it is necessary to dismount them when it is required to move the machine. These lengthy and laborious dismantlings are particularly undesirable when the handling machine must be moved frequently. Moreover the bulk of the bearer jack in the position in which it is returned into the supporting box girder of the stabilizer beam reduces the zone of the supporting box girder which may be employed for housing the supporting beam for the jack and thus reduces the maximum possible extension of the levelling members. Finally the bearer jacks which constitute the most important portions of the device as regards the safety of the installation at the time of its levelling in the working position, are directly exposed to impacts and mud spattering when the machine is made to move over bad ground. This may bring about wear and tear of the jacks which are prejudicial to their good operation and therefore to the safety of the installation at the time of its levelling at its working position.

SUMMARY OF INVENTION

It is an object of the invention to provide a machine stabilizer beam for use on unmade-up ground, which extends the frame of the machine laterally and comprises a supporting beam arranged horizontally and extending in a direction transverse to the machine axis, and a bearer jack fixed to the end of this beam remote from the frame of the machine, which enables levelling and moving about of the machine on unmade-up ground, whilst the bearer jack does not restrict the ground clearance in its inoperative position whatever the stroke of the jack, the machine being able in addition to move without the bearer shoes being dismounted and without the bearer jacks being exposed to impacts and mud spattering during movement of the machine.

It is a further object of the present invention to provide a stabilizer beam for stabilizing a machine for use on rough ground for extending the frame of the machine laterally, the stabilizer beam comprising a supporting box girder to be integral with or rigidly attached to the frame of the mahcine, a supporting beam slidable in the box girder, a bearer jack carrying a bearer shoe and pivotally connected to that one end of the beam to be remote from the machine frame such that the jack is movable from a rest position in which the jack is substantially horizontal and the bearer shoe is in contact with the end face of the beam, and an operative position in which the jack is substantially vertical, means for supporting and guiding the jack in its movement relative to the beam and pivotally mounted on the one end of the beam, means for locking the jack in its vertical position and operable on relative movement between the beam and box girder, and means for pushing and pulling in the directin of the axis of the beam and pivotally connected to the jack, the pushing and pulling means being operable to cause movement of the jack between its operative and inoperative position and extension and retraction of the beam relative to the box girder.

In a preferred embodiment of the invention the supporting beam is a box girder and the bearer jack is mounted to slide inside a sheath hinged to the end of the supporting beam for pivotal movement about horizontal axis transverse with respect to the axis of the supporting beam, the means for moving the bearer jack being arranged to cause by sliding in the sheath the retraction of the jack in its horizontal position entirely inside the box girder, this movement being stopped when the bearer shoe, which is connected to the end of the jack rod, comes into contact with the front face of the supporting beam.

In accordance with a preferred form of the invention the means for pulling and pushing are arranged to cause retraction and run-out of the supporting beam when the bearer jack is locked in its vertical position.

The invention will be more fully understood from the following description of an embodiment thereof, given by way of example only, with reference to FIGS. 3 to 13 of the accompanying drawings.

DETAILED DESCRIPTION OF DRAWING

Figure 1:
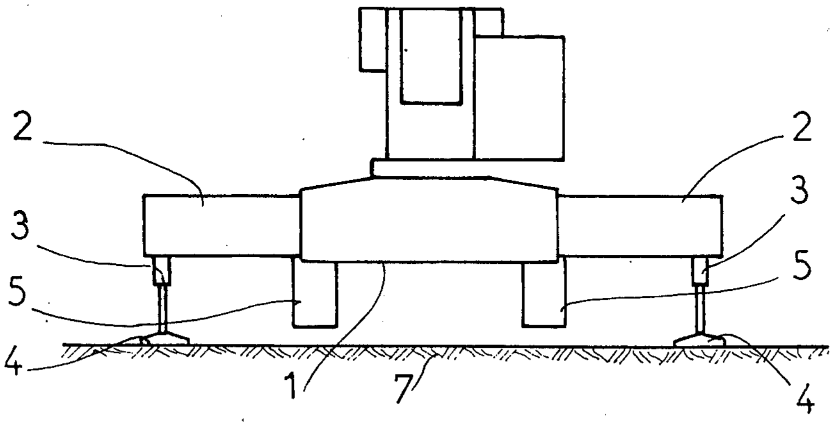
FIG. 1 is side elevational view of a mobile crane in its working position.
Figure 2:
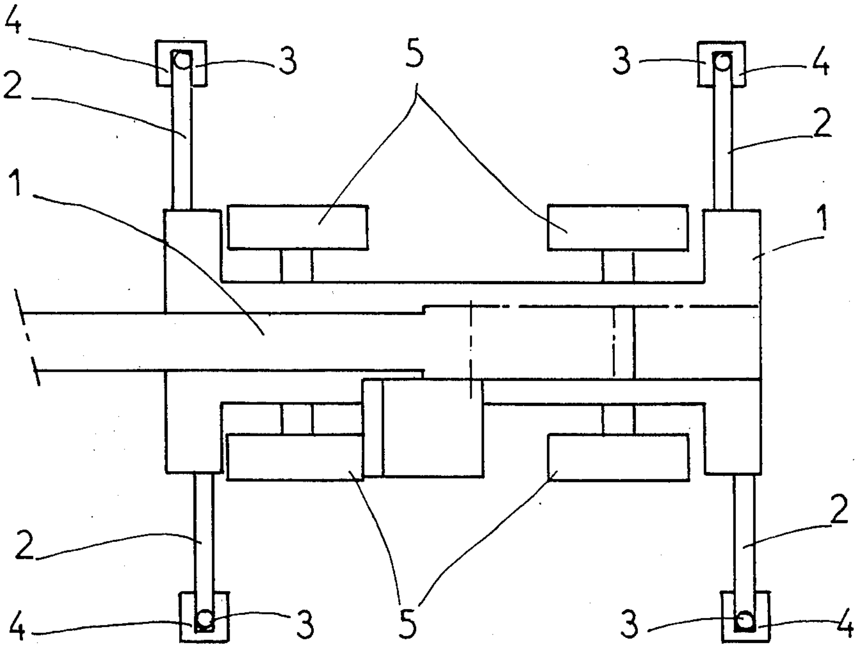
FIG. 2 is a diagramatic plan view of the mobile crane of FIG. 1 partially cut away and in its working position.

FIGS. 1 and 2 show a mobile crane in its working position in elevation and in plan respectively. The crane 1 rests on the ground 7 by means of jacks 3 the rods of which are connected at their bottom portions to bearer shoes 4. The jacks 3 are fixed to the outer ends of stabilizer beams 2 and the wheels 5 of the mobile crane are no longer in contact with the ground. In this position it may be seen that the bearing surface of the mobile crane is considerably increased with respect to the bearing surface of the machine wheels.

Figure 5:
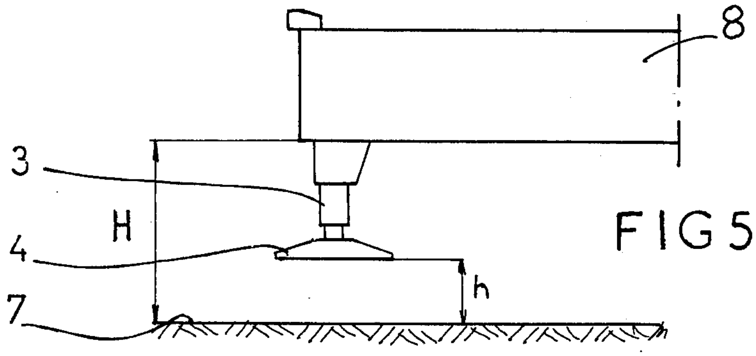
FIGS. 3, 4 and 5 are side views in elevation of an embodiment of a stabilizer beam in accordance with the invention showing stages of retraction of the beam.
Figure 4:
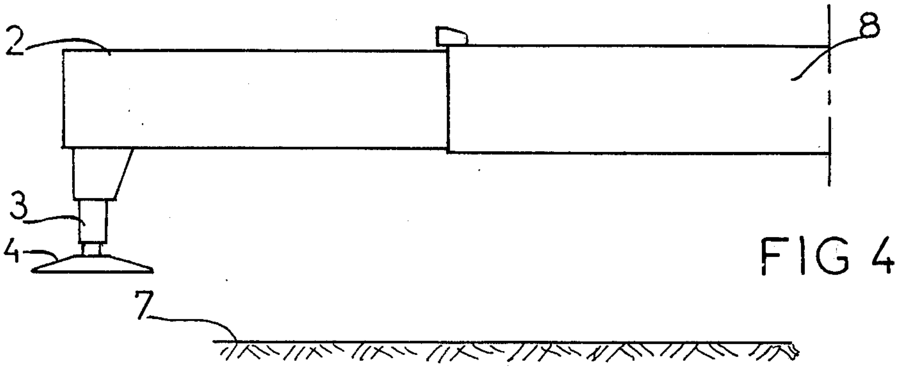
Figure 3:
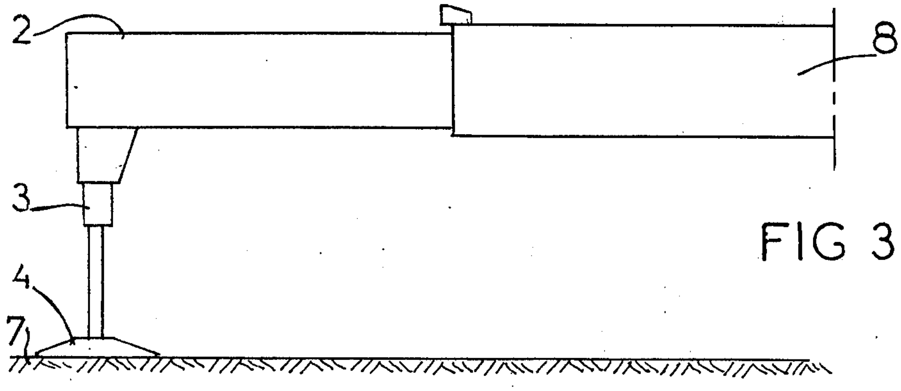

The beam 2 shown in FIGS. 3 to 6 is slidable in a supporting box girder 8 attached to or forming part of the frame of a handling machine of the type represented in FIGS. 1 and 2 and in FIGS. 3 to 6 it is represented in positions corresponding with the different phases of the operation of retraction of the beam from its bearing position to the position of complete retraction, when the handling machine may be moved over unmade-up ground. The relative positions of the bearer jack 3 and the beam 2 shown in FIGS. 3, 4 and 5 are identical for a known machine and for a machine equipped with a stabilizer beam in accordance with the invention.

In FIG. 3 the supporting beam 2 is in a runout position compatible with the clearance available at the work-station of the handling machine. The bearer jack 3 is in contact with the ground 7 by way of shoe 4.

Figure 6:
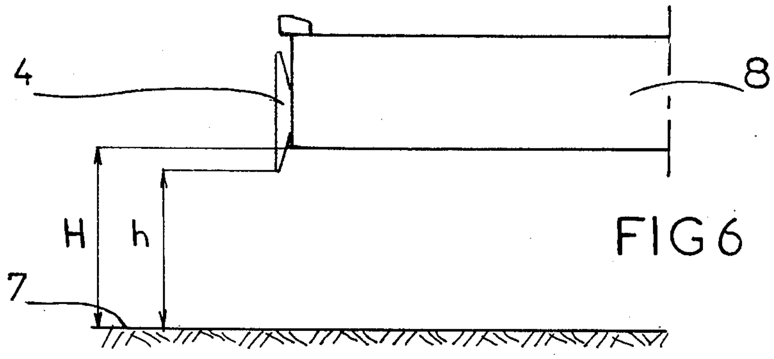
FIG. 6 is a side view showing the beam in a position of complete retraction of the bearer jack and the bearer shoe.

Retraction of the jack 3 as shown in FIG. 4 causes setting of the handling machine to rest on the ground by way of its wheels. In FIG. 5, retraction of the beam 2 inside its support 8 which is integral with or fixed to the frame of the machine, so far as its position of maximum retraction, reduces the lateral bulk of the handling machine to its minimum value. In conventional handling machines equipped with stabilizer beams of variable elongation the bearer jack remains in this position during movement of the machine. It may be seen that the ground clearance *h* of the bearer jack is considerably less than the ground clearance H of the stabilizer beam, this reduction in the ground clearance reducing to the same extent the manageability of the machine on unmade-up ground. In FIG. 6, on the contrary, there is shown the stabilizer beam in accordance with the invention with its bearer jack being in its position of complete retraction inside the beam 2 which in turn is in the position of retraction inside the supporting box girder 8, the bearer shoe 4 in the vertical position closing the end of the box girders constituting the support and the movable supporting beam. It can be seen that the clearance *h* is substantially identical with the ground clearance H of the stabilizer beam, the lateral extent in the two configurations being practically identical.

Figure 8:
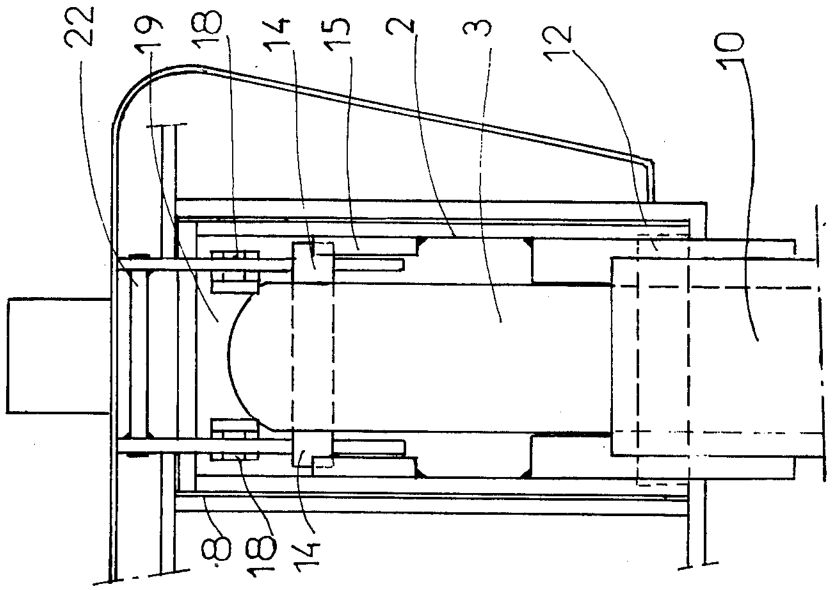
FIG. 8 is a front view taken along the line A—A in FIG. 7 of the beam.
Figure 7:
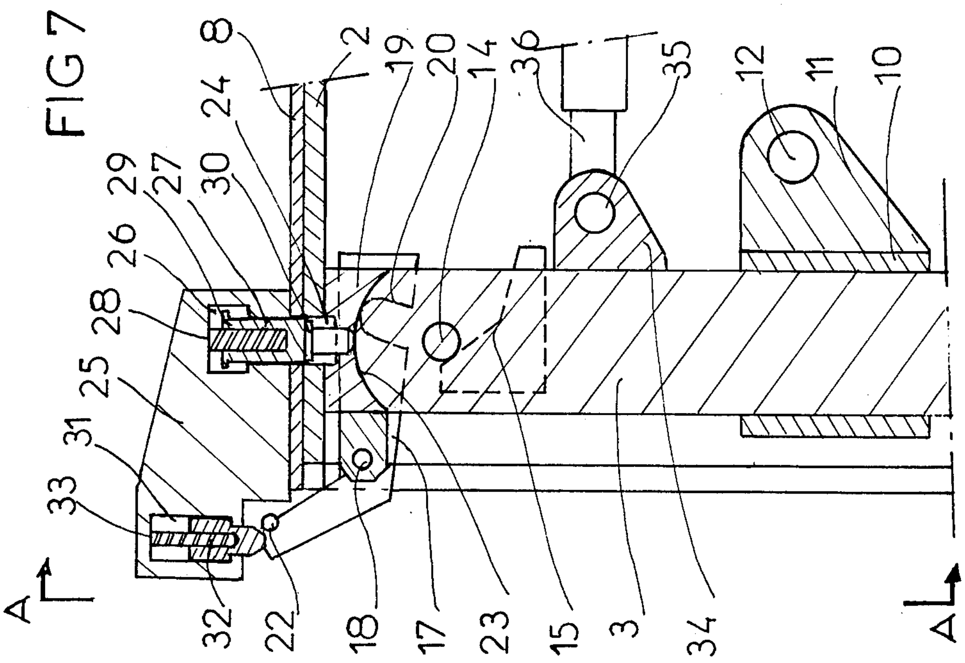
FIG. 7 is a section through the vertical plane of symmetry of the outer end of the beam of FIGS. 3 to 6.

There will now be described by referring to FIGS. 7 and 8 the pivotal device for retraction and locking of the bearer jack which enables disappearance of the jack as shown in FIG. 6. The beam 2 in the form of a box girder of rectangular section is mounted to slide inside the box girder 8 which forms a support connected in a rigid fashion to the frame of the handling machine. At the end of the beam 2 carrying the bearer jack 3 the lower horizontal face of the beam is cut away so as to leave clearance for the bearer jack 3. The same goes for the corresponding portion of the box girder 8 in correspondence with the opening in the beam 2 when the beam 2 is in its position of maximum retraction as shown in FIGS. 7 and 8. At the level of this opening in the box girder 2 a sheath 10 is hinged, by means of a member 11 bearing a horizontal spindle 12, to the beam 2. The body of the jack 3 is mounted to slide with light friction in the sheath 10. The jack 3 is thus movable both in translation in the sheath 10 and in rotation about the spindle 12 with respect to the beam 2. The body of the jack 3 carries at its upper portion two horizontal pins 14 directed towards the sidefaces of the beam 2. The beam 2 carries fixed rigidly on to the inner surfaces of the sidewalls two ramps 15 located at the level of the pins 14. A latch 17 having notches 20 is likewise hinged by a two-part horizontal spindle 18 on to a part 19 fast with the upper surface of the beam 2. The latch 17 has two identical arms on to which is fixed the spindle 18 and which include the notches 20 and a spindle 22 rigidly attached to each of the arms to form a stop. The part 19 attached to the inner face of the upper wall of the beam 2 has a concave portion 23 of spherical shape which is the complement of the convex spherical shape of the upper portion of the body of the jack 3. This part 19 has a hole 24 drilled therethrough and which opens into the upper portion of the spherical cavity in the part 19. The hole 24 has two portions of different diameters, the portion opening into the spherical cavity in the part 19 having a smaller diameter than the upper portion. To the outer face of the upper wall of the supporting box girder 8 is attached a part 25 including a recess 26 the lower portion of which is of smaller diameter and opens into the upper portion of the hole 24 in the part 19, when the beam 2 is in its position of maximum retraction as shown in FIGS. 7 and 8. The supporting box girder 8 is provided with an opening drilled therethrough to permit the cavity 26 and the hole 24 to communicate, these two cavities containing a bolt 27 in two portions the upper portion of which is urged downwardly by a spring 28 and the lower portion of which acts as pusher for the locking portion being forced downwards by the spring 28. Each of the two portions of the bolt 27 includes a collar restricting its downward stroke, the upper portion bearing a collar 29 and the bottom portion a collar 30. The part 25 also comprises a cavity 31 containing a resilient stop 32 urged downwardly by a spring 33. This stop 32 is in a position that it co-operates with the spindle 22 which acts as a stop on the latch 17 during the course of the movement of the movable stabilizer beam 2. The body of the jack 3 carries in addition a member 34 upon which is mounted a spindle 35 on which is hinged the rod 36 of a double-acting jack 37 the body of which is pivotally mounted at 38 to the supporting box girder 8.

Figure 9:
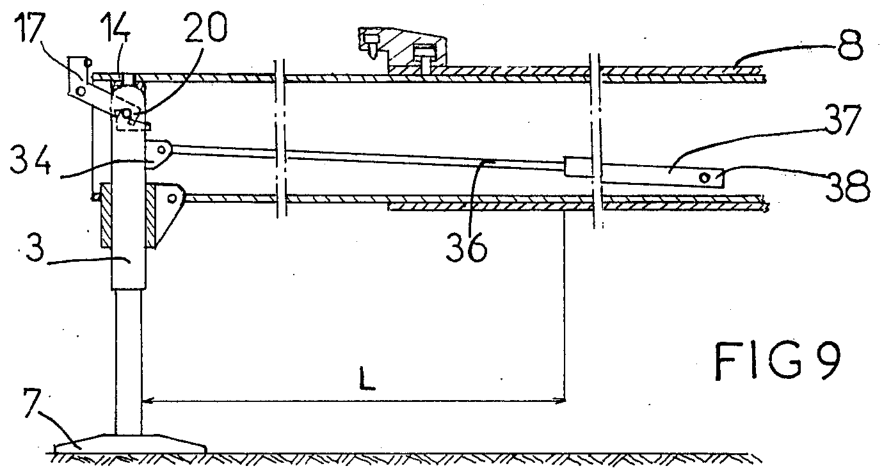
FIGS. 9 to 13 show on a scale smaller than that of FIG. 7 similar views of the beam during the different phases of the retraction of the beam and of its bearer jack from a position bearing on the ground (FIG. 9) up to a position of complete retraction (FIG. 13).

There will now be described by referring to FIGS. 9 to 13 the operation of retraction of the bearer jack and of retraction of the beam 2 inside the supporting box girder from the bearing position shown in FIG. 3 to the phase of complete reaction shown in FIG. 6. In FIG. 9 the bearer jack 3 is in its vertical position, extension of the rods of the jack to bring the shoes 4 into contact with the ground having been continued until the wheels of the handling vehicle leave the ground. The beam 2 is run out from the box girder 8 by a certain length L which is a function of the room available at the work-station of the handling machine. The jack 3 is kept in the vertical position by the locking member 17, the notches 20 of which are in engagement with the pins 14 fast with the body of the jack 3. The supporting beam 2 is kept in a position fixed with respect to the supporting box girder 8 by the double-acting jack 37 hinged at 38 to the supporting box girder 8. In this position the handling machine is therefore entirely stable since the several bearer jacks are locked in the vertical position and the position of the stabilizer beams relative to the box girders 8 is maintained constant with an amplitude of elongation such that the fitting assures a good bearing of the assembly.

Figure 10:
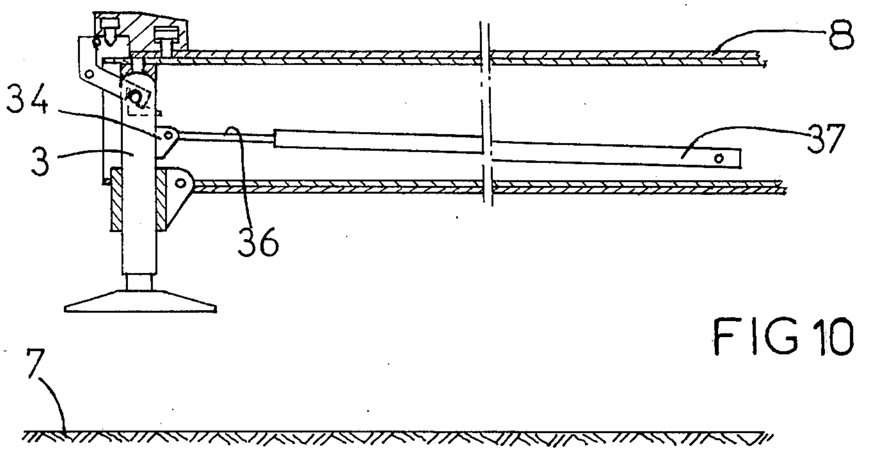

In FIG. 10, the bearer jacks 3 have been operated to retract the rods into the bodies of the jacks 3 so that the shoes 4 are out of contact with the ground, the machine resting on the ground by its wheels. Retraction of the rods of the jacks 3 is continued until the rods have been retracted to their maximum extent. Actuation of the double acting jack 37 then produces, by traction on the body of the jack 3 through the intermediary of the rod 36 fast with a spindle 35 fixed to the member 34 itself fixed to the body of the jack 3, retraction of the beam 2 into the interior of the girder 8, the jack 3 being maintained in its vertical position by the locking member 17.

Figure 11:
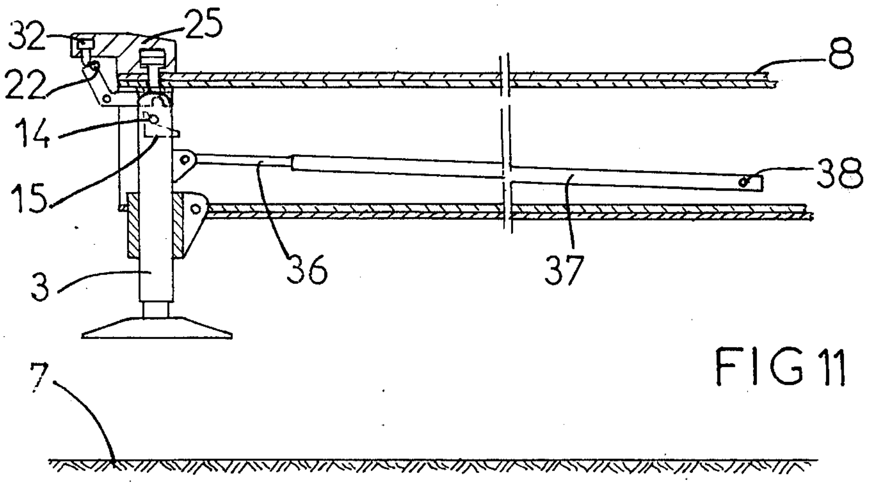

Movement of the rod 36 of the jack 38 then continues as shown in FIG. 11. The stop 22 of locking member 17 comes into contact with the resilient stop 32 which causes pivoting of the locking member 17 about spindle 18, the notches 20 disengaging from the pins 14 on the body of the jack 3 which can then be displaced, the pins 14 rolling and sliding on the ramps 15 fixed to the movable beam 2.

Figure 12:
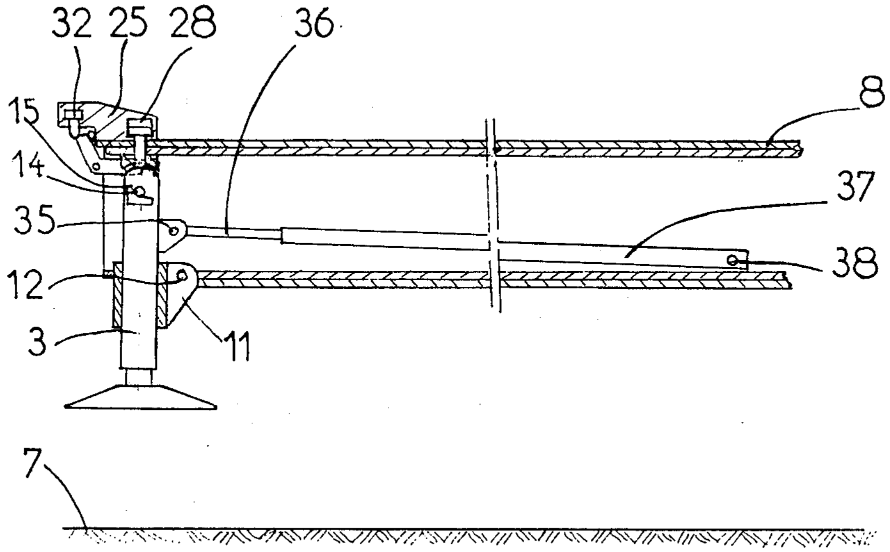

Displacement of the pins 14 on the ramps 15, shown in FIG. 12, causes downward movement of the jack 3 in the sheath 10 at the time as rotation of the sheath 10 and jack 3 about spindle 12 while the jack continues to exert a pull on the body of the jack 3 by the intermediary of its rod 36. The lower part of the bolt 27 falls into the hole 24 as the hole 24 becomes aligned with the bolt 27, as co-operation of the spherical surfaces of the jack 3 and the part 19 fixed to the beam 2 causes a supplementary retraction of the beam 2 inside the supporting box girder 8. During this movement the stop 22 on the latch 17 pushes the stop 32 back into its opening 31 against the spring 33 and the latch 17 is again in the postion shown in FIG. 12. The stop 22 being trapped between the stop 32 and the part 25, the latch 17 is held in its raised position during the course of the last portion of the retraction of the beam 2.

Figure 13:
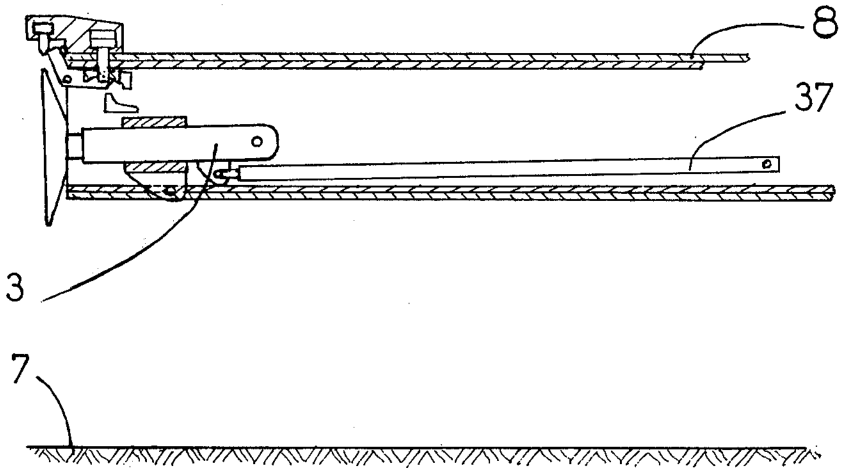

As pulling on the jack 3 by means of the rod of the jack 37 continues, the pins 14 travel along the lower portion of the ramps 15 and the jack 3 continues its movement of rotation about the spindle 12 whilst preserving a slight sliding movement inside the sheath 10. The pins 14 then leave the ramps 15 and the subsequent movement of the jack 3 is a movement of rotation about the spindle 12 until the jack is in a practically horizontal position as shown in FIG. 13. Subsequent movement of the rod 36 of the jack 37 then causes retraction of the jack 3 inside the box girder 2 by sliding inside the sheath 10. This movement stops when the bearer shoe 4 comes into contact with the front face of the beam 2 and the supporting box girder 8. The bearer jack is then in its position of complete retraction as shown in FIG. 13. The beam 2 too is in its position of maximum retraction and the cavity 26 containing the upper portion of the bolt 27 is in coincidence with the hole 24 the upper portion of which has been engaged by the lower portion of the bolt 27. The upper portion of the bolt 27 may then drop under the action of the spring 28 inside the upper portion of the cavity 24 to lock the beam 2 into its position of maximum retraction inside the supporting box girder 8.

The machine is then capable of moving over unmade-up ground without having its clearance from the ground reduced by the presence of the bearer jack.

The run-out movement of the bearer jack and the beam 2 is carried out by operations which are the reverse of those which have just been described, the thrust of the rod 36 of the jack 37 against the body of the jack 3 causing first of all outward sliding of the body of the jack inside the sheath 10. This sliding causes, at a given moment, tilting of the jack 3 under gravity about the spindle 12, the pins 14 then coming into contact with the lower portion of the ramps 15. The subsequent movement of the rod 36 of the jack 37 causes ascent of the ramps 15 by the pins 14 and hence raising of the body of the jack until its upper spherical portion seats itself in the spherical concave portion of the part 19 causing retraction into the cavity 24 of the lower portion of the bolt 27, which forms a pusher. The upper locking portion of the bolt 27 is then pushed back upwards until the movable beam 2 is totally freed as shown in FIG. 7. Co-operation between the two spherical surfaces on the jack 3 and on the part 19 then cause the start of the run-out of the movable beam 2 from the box girder 8. The stop 22 on the latch 17 then comes into contact with the stop 32, which causes the latch 17 to be put into position with the notches 20 in engagement with the pins 14. The jack 3 is then locked in its vertical position and the thrust of the jack rod 36 against the jack 3 causes outward movement of the movable beam 2, the stop 22 on the latch 17 causing the pushing aside of the stop 32 as it passes.

The movable beam may then be moved so as to bring the bearer jack over the spot chosen for bearing the handling machine and the rods of the jack are then run out to bring the bearer shoes 4 into contact with the ground and raise the handling machine, the wheels of which leave the ground.

It can be seen that, as the bearer jack was locked in its vertical position right from the start of the outward movement of the beam 2, the jack 3 may be brought to bear whatever the elongation of the movable beam 2.

It can be seen that in this way a stabilization device has been achieved in which the bearer jacks do not reduce the ground clearance of the stabilizer beams, in which the run-out of the jack may be effected at any time during the run-out of the stabilizer beam, in which safety of the bearings is ensured by a means of locking the bearer jacks in their active position and in which the retraction of the bearer jacks inside the stabilizer beams and the closure of the front face of these beams by the bearer shoes protect the jacks against impacts and soiling by mud during movement of the handling machine over unmade-up ground.

The invention is obviously not intended to be restricted to the details of the embodiment which has just been described, on the contrary it comprises any variant and the employment of equivalent means which can be conceived of without thereby departing from the scope of the invention. Thus one can conceive of means for pivoting the bearer jack which are independent of the means for retraction of the jack and the stabilizer beam, one can conceive of elements for constituting these pivoting and retraction means which differ from hydraulic jacks as described above, and one can conceive of systems of locking and bolting of the bearer jack and of the stabilizer beam which are different from those of the foregoing embodiment. A handling machine will comprise a number of stabilizer beams in accordance with the invention; generally four stabilizer beams will be employed to constitute a bearing frame which is rigid and stable during operation of the handling machine and of little bulk during the movement of the handling machine over unmade-up ground. The invention is applicable not only to mobile cranes but also to any handling machine which may be employed on rough ground and even to highway transport machines equipped with hoist means and to mobile drilling machines which require good stability in service and great facility of moving round on any ground. Finally the invention is just as applicable to the case of machines with telescopic beams of variable elongation as to the case of machines with rigid beams and fixed bulk.

What is claimed is:

1. A stabilizer beam for stabilizing a machine for use on rough ground for extending the frame of the machine laterally, the stabilizer beam comprising:

a supporting box girder to be integral with or rigidly attached to the frame of the machine;

a supporting beam slidable in the box girder;

a bearer jack carrying a bearer shoe;

means pivotally connecting the bearer jack to that one end of the beam to be remote from the machine frame such that the jack is movable from a rest position in which the jack is substantially horizontal and the bearer shoe is in contact with the end face of the beam, and an operative position in which the jack is substantially vertical;

means for supporting and guiding the jack in its movement relative to the beam;

means pivotally mounting the supporting and guiding means on the one end of the beam;

means for locking the jack in its vertical position and operable on relative movement between the beam and box girder;

means for pushing and pulling in the direction of the axis of the beam; and means for pivotally connecting the pushing and pulling means to the jack;

the pushing and pulling means being operable to cause movement of the jack between its operative and inoperative position and extension and retraction of the beam relative to the box girder.

2. A beam as claimed in claim 1, wherein the pulling and pushing means includes a hydraulic jack the rod of which is connected to the body of the bearer jack and the body of which is pivotally connected to the supporting box girder.

3. A beam as claimed in claim 1, wherein the locking means includes a lever pivotally connected to the supporting beam and having stop means and notch means, the body of the bearer jack including pin means, the stop means on the locking lever being arranged to cooperate with stop means carried by a portion of the stabilizer beam to place the notch means in engagement with the pin means on the bearer and to free the pin means from the notch means on movement of the beam with respect to the box girder.

4. A beam as claimed in claim 1, including a latch for locking the supporting beam in its position retracted inside the box girder and arranged in the vicinity of the bearer jack the body of which bears pin means in contact with guide means fixed to the supporting beam for guiding movement of the bearer jack by the pulling and pushing means and the actuation of the latch.

5. A mobile handling machine for use on rough ground, including a plurality of stabilizer beams as claimed in claim 1.

* * * * *